J. G. MOOMY.
PATCH FABRIC AND METHOD OF MAKING THE SAME.
APPLICATION FILED APR. 25, 1919.
1,325,798.  Patented Dec. 23, 1919.
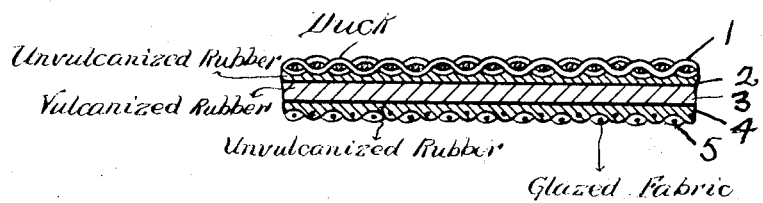
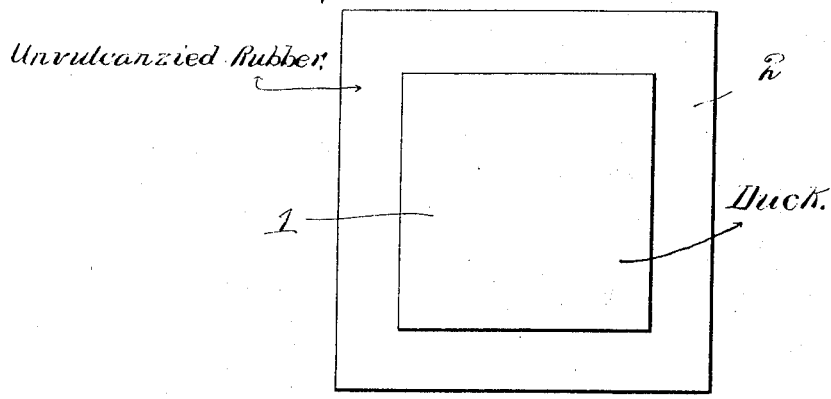
Inventor
Joseph G. Moomy
By W. C. Lord
Attorney

UNITED STATES PATENT OFFICE.

JOSEPH G. MOOMY, OF ERIE, PENNSYLVANIA.

PATCH FABRIC AND METHOD OF MAKING THE SAME.

1,325,798.  Specification of Letters Patent.  Patented Dec. 23, 1919.

Application filed April 25, 1919. Serial No. 292,708.

*To all whom it may concern:*

Be it known that I, JOSEPH G. MOOMY, a citizen of the United States, residing at Erie, in the county of Erie and State of Pennsylvania, have invented new and useful Improvements in Patch Fabrics and Methods of Making the Same, of which the following is a specification.

The fabric is particularly designed for repairing tubes for automobile tires.

As shown in the drawing: Figure 1 shows a cross section of the fabric.

Fig. 2 a plan view of the fabric showing a preferred form in which the elastic portions extend beyond the non-elastic portions.

The fabric comprises a backing 1 of comparatively strong fabric such as duck, a layer 2 of unvulcanized, preferably non-vulcanizing stock which is frictioned into and secured to the fabric 1, and 3 a layer of vulcanized rubber secured to the layer 2 of unvulcanized rubber preferably united with the layer of unvulcanized rubber by utilizing the non-vulcanizing quality in the layer 2 and uniting it with the layer 3 as the layer 3 is vulcanized. In this way the line of demarcation between the two layers is obliterated and the two layers become a unitary mass except that the body of the layer 2 remains unvulcanized where nonvulcanizing stock is used. 4 is a layer of unvulcanized stock preferably non-vulcanizing stock which is united to the layer 3 in the same manner as the layer 2, that is to say, if the non-vulcanizing stock is used it is united with the layer 3 as the layer 3 is vulcanized, thus making the union complete so that the whole is practically a unitary mass but with the body of the face of the layer 4 non-vulcanized. 5 is an air seal for the layer 4 ordinarily formed by a glazed fabric and this is detachably united with the layer 4 so the patch as a whole is vulcanized. One manner of accomplishing this is disclosed in my former Patent #1,111,804, Sept. 29, 1914.

It is desirable to have in a single patch the properties requisite for the many needs or peculiar requirements that may arise. The present patch material may be supplied to the user in comparatively large pieces and the user cut from this piece the size desired. If the nature of the use is such as to make the reinforcing incident to the backing 1 desirable the glazed fabric 5 is removed and the face of the raw material 4 secured to the tube or other part in making the patch. If, however, it is desirable that the patch have elasticity so that it will not make an abrupt shift in the tube from elasticity to the comparative rigidity of the backing 1 the backing 1 may be removed from the layer 2 by the simple application of gasolene of similar solvent to the backing 1. This is possible because of the non-vulcanized condition of the layer 2. After the removal of this fabric the surface of the layer 2 may be rendered nonadhesive by powdered talc or soap stone such as ordinarily supplied with repair kits. The face of the non-vulcanized layer 4 would be applied in the usual manner. In some instances it may be desirable to have a portion of the patch reinforced by the fabric 1 and to have the edges of the patch some distance from the fabric 1 elastic as shown in Fig. 2. If this is so this may be accomplished by the application of the solvent to the fabric only along the edges separating the fabric back from the edges to the desired distance and trimming it at this point. The remaining exposed portion of the layer 2 can then be treated with powder in the usual manner and the patch applied as above described. Where the patch is thus formed there is a zone of the patch outside of the fabric which gives with the elastic material to which the patch is applied and consequently there is less tendency for a breaking loose of the edge of the patch than is the case where there is the abrupt change from the non-elasticity of the elastic material of the tube to a patch having a backing of duck with comparatively no elasticity.

What I claim as new is:—

1. A patch fabric comprising a backing of comparatively firm fabric such as duck; a layer of non-vulcanizing stock frictioned into and united with the fabric; and a layer of vulcanized rubber secured to the non-vulcanized layer.

2. A patch fabric comprising a backing of fabric; a layer of non-vulcanizing stock frictioned into and united with the backing; and a layer of vulcanizing stock united to the non-vulcanizing layer as the vulcanized layer is vulcanized.

3. A patch fabric comprising a backing of comparatively firm fabric such as duck; a layer of unvulcanized stock united with the backing; a layer of vulcanizing rubber secured to the unvulcanized layer; and a layer of unvulcanized rubber secured to the layer of vulcanized rubber on the face opposite the backing.

4. A patch fabric comprising a backing of fabric; a layer of unvulcanizing stock united with the fabric; a layer of vulcanizing stock united with the layer of unvulcanizing stock as the vulcanizing layer is vulcanized; and a facing of unvulcanized rubber secured to the layer of vulcanized rubber opposite the backing.

5. A patch fabric comprising a backing of fabric; a layer of unvulcanizing stock united with the fabric; a layer of vulcanizing stock united with the layer of unvulcanizing stock as the vulcanizing layer is vulcanized; and a layer of unvulcanizing stock united with the layer of vulcanized rubber on the face opposite the backing as the layer of vulcanized rubber is vulcanized.

6. A patch fabric comprising a backing of fabric; a layer of unvulcanized rubber secured to the fabric; a layer of vulcanized rubber secured to the unvulcanized layer; a layer of unvulcanized rubber forming a facing for the layer of vulcanizing rubber opposite the backing; and an air proofing over the face of unvulcanized rubber.

7. A patch fabric comprising a backing of fabric; a layer of unvulcanized rubber secured to the fabric; a layer of vulcanized rubber secured to the unvulcanized layer; a layer of unvulcanized rubber forming a facing for the layer of vulcanizing rubber opposite the backing; and an air proofing of glazed fabric over the face of unvulcanized rubber.

8. A patch fabric comprising a backing of comparatively firm fabric such as duck; a layer of unvulcanizing stock united with the fabric; a layer of vulcanized rubber united with the non-vulcanizing layer as the vulcanized layer is vulcanized; a layer of non-vulcanizing stock forming a facing for the layer of vulcanized rubber opposite the backing and uniting with the layer of vulcanized rubber as the vulcanized rubber is vulcanized; and an air proofing for the non-vulcanizing layer forming a facing for the layer of vulcanized rubber secured to the layer of unvulcanized rubber as the vulcanized rubber is vulcanized.

9. The method of forming a patch fabric which consists in frictioning a backing fabric with non-vulcanizing stock; placing a layer of vulcanizing stock in contact with the surface of the non-vulcanizing stock; vulcanizing the vulcanizing layer while in contact with the non-vulcanizing stock; and uniting these layers leaving a portion of the non-vulcanizing stock in the backing unvulcanized whereby it may be detached by the application of a solvent to the backing.

10. The method of forming a patch fabric which consists in frictioning a backing fabric with non-vulcanizing stock; placing a layer of vulcanizing stock in contact with the surface of the non-vulcanizing stock; vulcanizing the vulcanizing layer while in contact with the non-vulcanizing stock; and uniting a layer of non-vulcanizing stock in the same operation to the layer of vulcanized rubber as the vulcanized rubber is vulcanized.

11. The method of forming a patch fabric which consists in frictioning a backing fabric with non-vulcanizing stock; placing a layer of vulcanizing stock in contact with the surface of the non-vulcanizing stock; vulcanizing the vulcanizing layer while in contact with the non-vulcanizing stock; uniting a layer of non-vulcanizing stock in the same operation to the layer of vulcanized rubber as the vulcanized rubber is vulcanized; and securing to the face of the last-named layer of non-vulcanizing stock an air proof fabric, the same being united with the non-vulcanizing layer during the vulcanizing operation of the vulcanized layer of rubber.

12. A patch fabric comprising a backing of comparatively firm fabric, such as duck; a rubber layer extending beyond the edge of the duck fabric forming an elastic edge thereon; and an unvulcanized face on said rubber layer.

In testimony whereof I have hereunto set my hand.

JOSEPH G. MOOMY.